United States Patent [19]
Emery

[11] Patent Number: 6,133,500
[45] Date of Patent: *Oct. 17, 2000

[54] METHOD AND APPARATUS FOR THE CONTROLLED REDUCTION OF ORGANIC MATERIAL

[75] Inventor: Charles Leslie Emery, Colborne, Canada

[73] Assignee: Emery Microwave Management, Inc., Ontario, Canada

[ * ] Notice: This patent is subject to a terminal disclaimer.

[21] Appl. No.: 08/980,457

[22] Filed: Nov. 26, 1997

Related U.S. Application Data

[60] Continuation of application No. 08/539,721, Oct. 5, 1995, abandoned, which is a division of application No. 08/188,350, Sep. 1, 1993, Pat. No. 5,507,927, which is a continuation of application No. 07/828,131, Jan. 30, 1992, abandoned, which is a continuation-in-part of application No. 07/463,491, Jan. 11, 1990, abandoned.

[51] Int. Cl.$^7$ ............................................. B09B 3/00
[52] U.S. Cl. ......................... 588/900; 219/678; 422/186; 422/184.1; 204/157.43; 204/158.2; 204/158.21
[58] Field of Search ..................... 588/900; 219/678; 422/186, 184.1; 204/157.43, 158.2, 158.21

[56] References Cited

U.S. PATENT DOCUMENTS

| | | | |
|---|---|---|---|
| 3,449,213 | 6/1969 | Knapp | 201/19 |
| 3,777,095 | 12/1973 | Muranaka | 219/10.55 |
| 4,118,282 | 10/1978 | Wallace | 201/2.5 |
| 4,123,230 | 10/1978 | Kirkbride | 44/1 R |
| 4,148,614 | 4/1979 | Kirkbride | 44/1 R |
| 4,187,405 | 2/1980 | Puschner et al. | 219/10.55 A |
| 4,234,402 | 11/1980 | Kirkbride | 204/162 R |
| 4,313,011 | 1/1982 | Weil et al. | 585/240 |
| 4,364,745 | 12/1982 | Weil | 48/209 |
| 4,376,034 | 3/1983 | Wall | 208/11 R |
| 4,434,345 | 2/1984 | Muscatell | 219/10.55 R |
| 4,592,291 | 6/1986 | Sullivan, III | 110/346 |
| 4,631,133 | 12/1986 | Axelrod | 210/739 |
| 4,759,300 | 7/1988 | Hansen et al. | 110/229 |
| 4,817,711 | 4/1989 | Jeambey | 166/248 |
| 4,826,566 | 5/1989 | Burkart | 162/14 |
| 5,084,140 | 1/1992 | Holland | 201/19 |

FOREIGN PATENT DOCUMENTS

| | | |
|---|---|---|
| 1082130 | of 1980 | Canada . |
| 1158432 | 12/1983 | Canada . |
| 1221743 | 5/1987 | Canada . |
| 1240861 | of 1988 | Canada . |
| 318598A1 | 6/1989 | European Pat. Off. . |
| 403249671 | 4/1991 | Germany . |
| 58-88084 | 5/1983 | Japan . |
| 58-88085 | 5/1983 | Japan . |
| 1092861 | 11/1967 | United Kingdom . |
| 2018813A | 10/1979 | United Kingdom . |
| 8904355 | 5/1989 | WIPO . |
| WO 91/15248 | 10/1991 | WIPO . |

OTHER PUBLICATIONS

Handbook of Chemistry and Physics, 56th Edition, CRC Press, Inc., p. B–147, 1975–1976.

Microwave Conversion of Scrap Tires, The Technology International 1993, pp. 205–206, by K.M. Holland, K. Nash and C.R. McDonald, BRC Environmental Services and Dr. H.A. Chase, University of Cambridge.

Unit Operations of Chemical Engineering, Warren L. McCabe and Julian C. Smith, McGraw–Hill Book Company, Inc., pp. 427–428 and 451, Article 52–57, 51: Article 95–99 and 51: Article 51–123–126, 1956.

*Primary Examiner*—Dwayne C. Jones
*Assistant Examiner*—C. Delacroix-Muirheid
*Attorney, Agent, or Firm*—Blank Rome Comisky & McCauley

[57] ABSTRACT

There is provided a new and useful method and apparatus for the controlled non-pyrolytic reduction of organic material comprising subjecting the material to microwave radiation in a reducing atmosphere.

15 Claims, 2 Drawing Sheets

METHOD AND APPARATUS FOR THE CONTROLLED REDUCTION OF ORGANIC MATERIAL

CROSS REFERENCES TO RELATED APPLICATIONS

This is a continuation of application Ser. No. 08/539,721 filed Oct. 15, 1995, now abandoned, which is a divisional of 08/188,750, filed Sep. 1, 1993, now U.S. Pat. No. 5,507,927, which is a continuation of application Ser. No. 07/828,131 filed Jan. 30, 1992, now abandoned, which was a continuation-in-part of Ser. No. 07/463,491, filed Jan. 11, 1990, now abandoned.

FIELD OF THE INVENTION

This application relates to a method and apparatus for the reduction of organic materials using microwave radiation.

BACKGROUND OF THE INVENTION

There are numerous instances in diverse areas where it is desirable that organic materials be reduced. Such a requirement may arise in the processing of raw materials, as, for example, in the extraction of oil from oil shales, or in the treatment of waste materials.

The waste treatment category will arise in an endless number of situations. This may be due to the useful life of the product having been completed. For example, huge quantities of worn out tires are in existence. The waste may also arise from normal industrial processes. Refinery sludge and pulp mill effluents are examples. Municipal sewage and garbage are other sources of large quantities of organic waste.

Various considerations dependent on the particular waste type mandate that the waste be treated. In the case of municipal sewage, for example, the waste is a health and environmental hazard and its toxicity must be neutralized. In the case of tires the emphasis is on recycling of the very substantial amounts particularly of oil and carbon black which are the major components of tires.

The treatment of various of these waste types as, for example, by burning, may itself lead to environmental pollution problems.

There is therefore an ongoing need for more efficient treatment and recycling methods for organic materials.

Against this background the present invention is directed toward the use of microwave energy in a method and apparatus which is applicable in a very general sense to a very wide range of organic materials.

PRIOR ART

Applicant is unaware of any prior use of microwave energy in the treatment of organic materials for non-pyrolytic reduction purposes. Canadian Patent No. 1,158,432, issued Dec. 13, 1983, to Tillitt, suggests the use of microwave energy in drying bulk materials such as grains. The patent offers no aid to the reduction problem discussed above.

U.S. Pat. No. 4,123,230, granted Oct. 31, 1978, to Kirkbride, suggests the use of multiple wave sources, but these are used to provide microwaves of different frequencies. There is no suggestion of focusing nor of creating a uniform or preferred distribution pattern.

U.S. Pat. No. 4,184,614, granted Apr. 10, 1979, also to Kirkbride, describes a somewhat different process than that set out in the preceding reference but contains the same material in respect of the microwave energy.

Similarly, a third Kirkbride patent, U.S. Pat. No. 4,234,402, issued Nov. 18, 1980, describes the same microwave generator arrangement.

U.S. Pat. No. 4,376,034, granted Mar. 8, 1983, to Wall, shows use of a pair of microwave generators at opposite ends of a reactor. A very inefficient use of reflected waves is the basis of this microwave application.

The prior art has generally not addressed itself to the more efficient use of microwaves, but has simply incorporated into various processes commercially available microwave generation systems.

BRIEF SUMMARY OF THE INVENTION

It has now been determined that a wide variety of organic materials can be treated with microwave energy for controlling toxicity, for recycling purposes and for various processing purposes.

Thus the invention provides a method for the controlled non-pyrolytic reduction of organic materials which method comprises subjecting the materials to microwave radiation in a reducing atmosphere.

In a further embodiment of the invention there is provided a method for the non-pyrolytic breakdown of longer chain molecules in organic materials which method comprises subjecting molecules to microwave radiation in a reducing atmosphere.

In a further embodiment there is provided an apparatus for the controlled non-pyrolytic reduction of organic material by microwave radiation comprising a microwave chamber, means for feeding the organic material into the chamber, at least one microwave generator in the chamber, means for removing gaseous products from the chamber and means for removing solid residues from the chamber.

Figure 1:
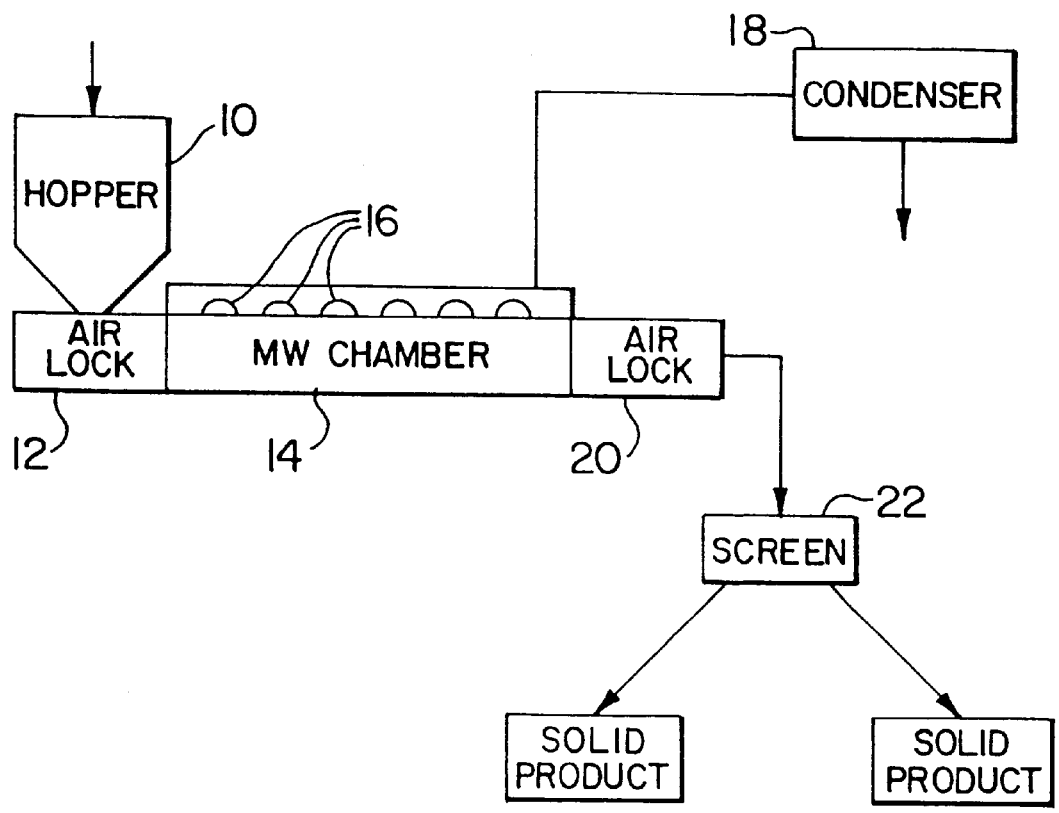
FIG. 1 illustrates schematically the method according to the invention.

While the invention will be described in conjunction with preferred embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

The method and apparatus of the invention can be applied to an almost limitless variety of organic materials. It is believed that the microwave energy results in the severing of weaker molecular bonds in longer chain molecules to reduce those molecules to simpler forms. This is in effect a de-polymerization process. The process is controlled to avoid pyrolysis of the organic material.

A general schematic of the invention is illustrated in the drawing. Materials are fed into a hopper 10 or into a similar means suitable to the particular feed material.

The material is then fed via an air lock 12 into a microwave chamber 14. The material is irradiated by microwave energy from magnetrons 16.

Gaseous products are taken off to a condenser 18 and condensed to liquid products, generally oils and sulfur.

Solid residues exit the chamber 14 through a second air lock 20. These products are than separated, as by screen 22, into various groups. Carbon black will normally comprise a substantial part of these products. Others would include, for example, steel in the case of tire reduction.

Optimum process conditions and apparatus configuration will be selected for a given material after an initial analysis of that material. Several types of analyses are preferably carried out with differing objectives.

Thus, an initial analysis of shape and structure may be made with a view to adapting the microwave chamber and the feeder means to that material. For example, the toroidal shape of tires suggests a different feeder and chamber design than, say, a cube of compressed plastic scrap.

A further analysis is then preferably performed on the material to determine its composition. For example, in treating material which might be categorized essentially as PVC, one would also like to know the quantities of extenders and other such components which might be present.

The results of this analysis will provide information as to the products which are likely to be obtained from the breakdown of the material, the quantities of each such product that might be expected and the order in which the products are likely to be obtained.

A further analysis is then carried out, generally by lab testing, to determine the energy requirement for the process. Having determined that requirement per unit of throughput material, and knowing the volume of material required to be processed, the total energy requirement can be calculated.

The result of these analyses can then be used to optimize apparatus design and process conditions for the various stages in the process.

In the flow of material through the process the first area of concern is in the feeding arrangement.

While the process can be carried out on a batch basis, it is much preferred that it be continuous. Accordingly, since the microwave chamber must be sealed, the feeding apparatus must meet this requirement. One such feeding apparatus design which is useful with a variety of feed material is a piston and cylinder arrangement. For solid feeds a feed hopper can be located above and toward one end of a cylindrical feed conduit to deliver feed material to the conduit. A piston may then be utilized to move the material along the conduit toward the microwave chamber. The continuous plug formed in the feed conduit by the feed material will serve to seal the inlet to the microwave chamber.

A second preferred apparatus for bulk materials and relatively low temperature operations is in the form of an endless belt conveyor. The belt material must be permeable to microwaves and must not itself break down under conditions of use.

For higher temperature operations another preferred feed apparatus comprises one or more stainless steel screw conveyors.

For certain material configurations an airlock may be introduced at the entry to the microwave chamber.

Similarly, in some cases an airlock will be necessary at the solids outlet from the microwave chamber.

The next consideration in the flow of material through the process is the shape of the microwave chamber itself.

Several factors will influence the physical characteristics of the microwave chamber into which the feed material is introduced. The overall shape of the chamber will generally be chosen based on the physical characteristics of the feed material and the type of feed apparatus utilized. For example, where the piston and cylinder feed arrangement is utilized, a cylindrical chamber may be chosen, where an endless belt conveyor is utilized, a chamber of rectangular cross-section will generally be preferred.

The overall shape is also influenced by the desire to obtain maximum microwave penetration into the material being processed.

Having determined total power requirements and a basic cross section for the chamber, other factors come into play for purposes of optimization.

A number of variables in the process and apparatus can be predetermined for a given application or controlled in the course of carrying out the method. For a given application the objective is to obtain the most efficient operation in terms of energy applied per unit mass of material processed, always subject to various process constraints to be discussed.

The manner of applying the total energy requirement in a given case is generally established by a balancing of factors. In order to supply sufficient energy to initiate the reaction in a reasonable time and then to obtain the desired products from the material in the desired sequence, one must appropriately control applied energy. Thus, the basic microwave generation may be obtained from multiple small wave generators rather than from a single magnetron. The output from the wave generators may be continuous, pulsed or otherwise varied. The strength of the microwaves generated can be varied by varying the power input to the generators.

A typical chamber of rectangular cross section might include 4 transverse rows of 3 microwave generators each.

In addition to the arrangement and power of the wave generators, the energy applied per unit mass of treated material will be effected by the time of exposure of the material to the microwave; that is, the dwell time of the material. The energy factors must at this point again be taken in context with chamber geometry. Thus, dwell time may be directly affected by the rate of feed of the material being processed, but, as well, the length of the chamber may be varied and the mass under bombardment may be varied by varying the capacity of the microwave chamber.

Furthermore, the focus of the microwaves contributes markedly to efficiency, and parabolic wave guides have been developed to provide a focus for the waves from a given generator. A series of wave guides may be used with a series of wave generators to provide an overlapping series of microwave curtains to allow very good control of the amount of energy applied to the material.

The surface temperature of the material strongly effects microwave absorption by the material, so it is highly preferable that the surface temperature be monitored and that the power input to the microwave generators be adjusted as required to obtain optimum surface temperature. Thus, as the reactions proceed as the material moves through the microwave chamber, less energy input may be required to maintain optimum surface temperature, so that downstream microwave generators may be operated at lower power input.

It is also useful to monitor the internal temperature of the material in the microwave chamber as a means of predicting what products are likely to be coming off the material at any time. The microwave chamber is preferably kept at slightly above atmospheric pressure. The pressure facilitates removal of gaseous products.

It has been found that the process works better in a more dense atmosphere. Accordingly, after the process is started up and run to the point where the first of the material fed into the chamber has been substantially broken down, the process is found to proceed more efficiently. In that regard the process must be carried out in a reducing atmosphere, and the concentration of reducing gases is increased as the material is broken down. It is theorized that the presence of additional reducing gases may tend to aid in further breakdown of the material, particularly at its surface.

It may be preferable in some instances to utilize a two part chamber to isolate the wave generators from the reducing atmosphere. A horizontal microwave permeable gas impermeable barrier would be one solution, with the top and bottom parts of the chamber both being resonant.

It may be necessary to add a reducing gas with the feed material. The purpose of the reducing gas is to damp out any oxidation which might otherwise occur during start-up with possible catastrophic results. An inert gas such as nitrogen might also be used, but any compatible reducing gas will do. It should be noted that it is not generally necessary that a reducing gas be added, but that the possibility exists in certain instances.

It has been found that some catalysts enhance the efficiency of the process. Thus, the addition of carbon black to the input material in the case of tires results in the oils coming off the material more quickly and at lower temperatures.

A further external factor will frequently be present which will be of primary concern in terms of the balancing of the internal factors. The physical space available in a plant to accommodate apparatus according to the invention is often limited, so all of the controllable factors must be balanced in the face of that restriction. The importance of this space consideration is highlighted by the fact that some installations may have a substantial overall length. For example, lengths in the order of 30 to 60 feet will not be unusual.

In that regard a preferred approach is to utilize a series of modules connected end to end. This has several advantages. Among these is the ability to remove and replace a single module to carry out repairs, thereby avoiding downtime. A further advantage is in ease of manufacture and handling of smaller modules. A preferred module is about 6 feet in length overall.

Power availability is a further external variable which may be beyond the control of a user, usually because of the particular location of the plant.

The products of the process are obtained in the form of gaseous and solid material. The gaseous materials are recovered utilizing one or more aspirators on the microwave chamber. The solid products are in the form of residues conveyed through a microwave chamber outlet.

The gaseous products are condensed to provide various hydrocarbon liquids. In that regard it may be necessary to provide heat to the exhaust system to prevent premature condensation.

The solid products comprise carbon black in micron size and various inorganic materials which may have been present in the feed. For example, in addition to the various oils and carbon black obtained from tires, the residues will include steel, silica and the like components.

For example, a typical PVC lab sample yielded 125 gms solid residue from 160 gms of the original PVC. The residue was almost entirely carbon black containing in total less than 3.159 ppm of the following elements and compounds: As; Ba; B; Cd; Cr; Pb; Se; U; $NO_2+NO_3$; $NO_2$; Ag; Hg; CN(F); F.

As a further example, typical tires will yield per tone of tires, 3 to 4 barrels of oil, 575 to 700 lbs. of carbon black, 85 to 100 lbs. of steel and 70 to 80 lbs. of fibre.

Figure 2:
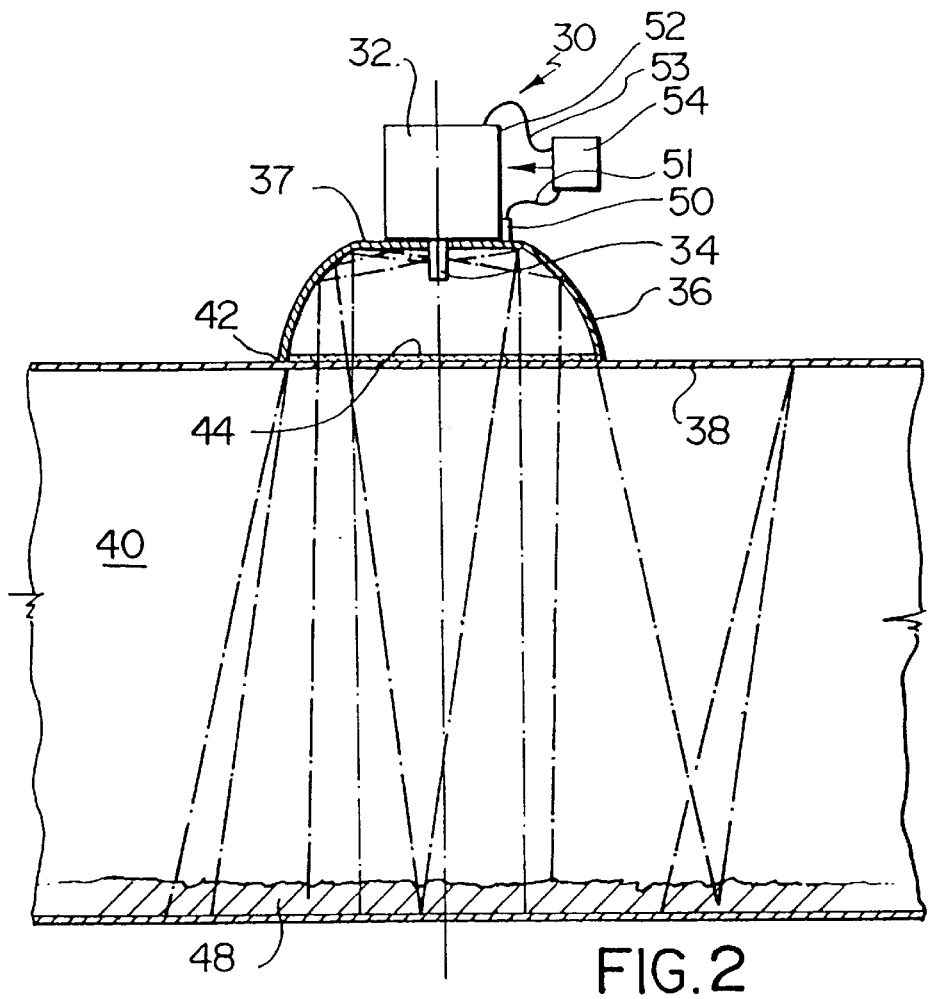
FIG. 2 illustrates schematically a microwave generator and parabolic wave guide for use in the invention.
Figure 3:
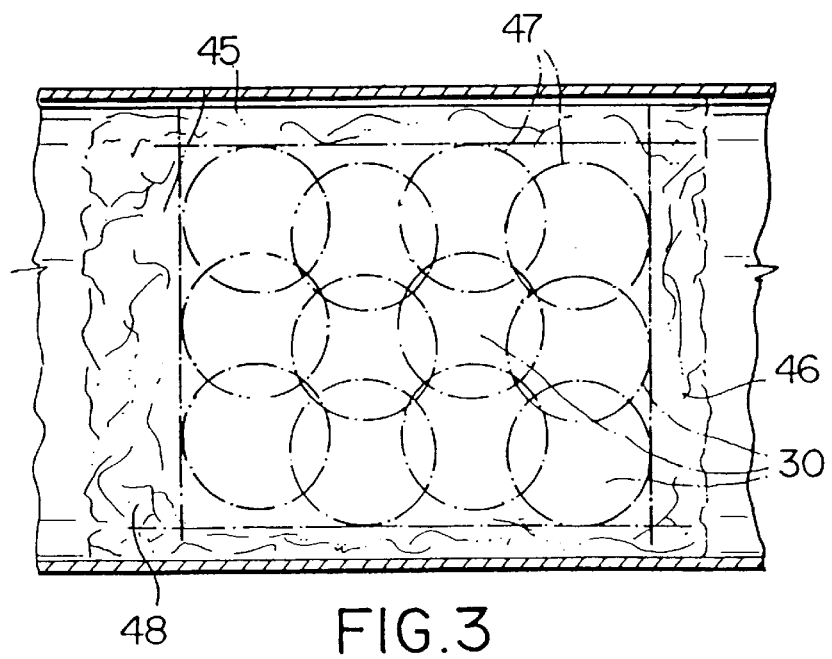
FIG. 3 illustrates a pattern for application of microwaves in a preferred embodiment of the invention.

FIGS. 2 and 3 illustrate a preferred apparatus for carrying out one embodiment of the invention.

Microwave generators utilized in industrial processes have generally been very inefficient in that they have utilized in general the technique of heating a material simply by bombarding it in a manner which leads to a very non-uniform distribution of microwave energy through the material. The result in such cases is that some parts of the material are undertreated and others overtreated.

In such cases, in order to ensure that all material receives a minimum input of microwave energy, a great deal of energy waste occurs.

Furthermore, depending on the material being processed, specific patterns of applied microwaves may be much more efficient than others. With the commonly used general bombarding approach, such varying patterns are not available.

Serious problems of energy loss have also existed in using various wave guide types to distribute generated microwaves. For example, some wave guides have had elongated and non-linear paths and have resulted in only weak waves reaching the site of a material to be treated.

Further, a view has been firmly held by some manufacturers of microwave units that multiple wave generators are an impractical solution to the distribution problem because of the problem of interference between waves produced by the various generators The apparatus of FIGS. 2 and 3 addresses these problems.

FIG. 2 illustrates a microwave generating apparatus 30 according to the invention comprising a magnetron 32, an antenna 34 and a reflecting surface or wave guide 36. The apparatus 30 is illustrated mounted in wall 38 of a microwave chamber 40. The outer extremity 42 of reflecting surface 36 is mounted flush with wall 38. The opening defined by the extremity 42 of reflecting surface 36 is covered by a ceramic plate 44.

The reflecting surface 36 may be designed to achieve a desired pattern of wave application but in the preferred case is substantially parabolic to provide a substantially circular area of wave application. The top 37 of the reflecting surface 36 is preferably flattened. This allows for easy mounting of the unit but also allows the antenna 34 to be positioned at or near the focus of the parabola.

The boundaries of the pattern may be adjusted by appropriate design of the wave guide in combination with a particular placement of antenna 34. The focus of the pattern can subsequently preferably be adjusted by adjusting placement of antenna 34. The antenna 34 is preferably adjustable over about one inch of travel axially of the reflector 36.

Thus, for example, in the most preferred configuration the combination of the antenna 34 and reflecting surface 36 is adjusted to provide a slightly off focus application of microwaves so that the diameter of the area of application of microwaves is greater than the diameter of the extremity 42 of reflecting surface 36.

Application of microwaves is fairly uniform over the circular area.

A series of apparatus 30 can then be arranged as illustrated in FIG. 3 to provide the desired overlapping pattern 46, the area of which is defined by lines 45 through the outer ones 47 of the generators 30 of the array. In this configuration there is produced in effect a microwave cloud which will provide a reasonably uniform distribution of microwave energy to a material 48 in chamber 40.

In a preferred configuration the apparatus 30 is provided with a temperature sensor 50 mounted in the housing 52 of magnetron 32. Sensor 50 is in turn connected by conductors 51 to a controller 54 which will switch off magnetron 32 via conductors 53 when the sensor 50 registers a limiting temperature and will switch magnetron 32 back on after a preset time period.

Thus, where a non-uniform feed material such as motor vehicle tires is being processed, at times there will be no material beneath an apparatus 30 as, for example, when the open center part of a tire is passing underneath the apparatus. In that case waves reflected from the bottom wall 56 of chamber 40 will cause the apparatus 30 to heat up to the point where the sensor 50 will send a signal to controller 54 causing the magnetron to shut down. After a predetermined period which in the tire case would relate to the time required for the open area of the tire to pass the apparatus 30, magnetron 32 will be switched back on.

This has the combined effect of preventing the apparatus 30 from overheating, and of saving energy.

While the process is widely applicable, and thus highly variable in construction, in a typical case, for example, for reduction of motor vehicle tires, a series of 10 modular tunnels may be used in series to provide a rectangular tunnel of about 60 feet in length and with a cross section of about 14 inches by 36 inches. In a preferred embodiment, two such 60' tunnels would be used in a tire reduction plant. A series of 12 overlapping magnetrons may be used in each module as shown in FIG. 3. Each magnetron may have 1.5 kilowatts of power at a wavelength of 2450 MHz.

The typical process will be carried out at a slight positive pressure of about ¼ to ½ inch of water and at maximum temperatures of about 350° C. The sensor 50 will typically switch off the magnetron at a temperature of about 70° C.

Typically the reflectors 36 have a diameter of about 7½ inches to 7¾ inches at the extremity of the parabola. The top section 17 is typically about 3⅛ inches wide and the reflector about 2½ inches deep.

In the preferred tire plant with twin tunnels, operating under the above conditions, a continuous tire feed rate on a conveyor, running at 3 feet per minute will give a dwell time of about 20 minutes and a throughput capacity of 1,440 tires per 24 hours for each 60 foot tunnel.

It is notable that this plant would produce no emissions at all. Gaseous products consist of a narrow band of oils about the consistency of No. 2 diesel fuel, along with elemental sulphur which is condensed separately.

The controlled reduction of the invention avoids emissions problems common in other waste reduction processes, including prior microwave based processes.

What I claim as my invention:

1. An apparatus for the controlled non-pyrolytic reduction of organic material, said apparatus comprising:

a microwave chamber;

means for feeding said material into said chamber;

an array of microwave generators associated with said chamber, said array of microwave generators being arranged such that said array transmits as a group in an area of said chamber an overall predetermined pattern of microwave radiation onto said material which radiation is evenly distributed throughout said area of said chamber;

means for monitoring the temperature of said material in said chamber and for controlling said array of microwave generators responsive to said monitored temperature so as to avoid significant pyrolysis of said material;

means for removing gaseous products from said chamber; and means for removing solid products from said chamber.

2. The apparatus of claim 1 wherein said chamber is cylindrical.

3. The apparatus of claim 1 wherein said means for feeding comprises a piston and cylinder.

4. The apparatus of claim 1 wherein said chamber is a resonant cavity.

5. The apparatus of claim 1 including at least two said generators arranged in said chamber in an upstream and downstream relationship relative to the flow of said material.

6. The apparatus of claim 5 wherein said upstream generator is of greater power output than said downstream generator.

7. The apparatus of claim 1 including at least one parabolic wave guide for focusing the microwave output of said generator.

8. The apparatus of claim 1 wherein said chamber is rectangular in cross-section.

9. The apparatus of claim 1 wherein said chamber includes 4 transverse rows of 3 microwave generators each.

10. The apparatus of claim 1 wherein each one of said array of microwave generators comprises:

at least one microwave generator;

an antenna connected to each said generator for transmitting microwave energy from said generator; and a reflecting surface for reflecting microwave energy from each said antenna in a predetermined pattern onto said material to be treated.

11. The apparatus of claim 10 wherein said microwave chamber is rectangular in cross-section.

12. The apparatus of claim 1 wherein said array comprises 3 rows of 4 microwave generates in each row.

13. The apparatus of claim 1 wherein each said microwave generator in said array generates a substantially circular area of microwave radiation.

14. The apparatus of claim 13 wherein each said circular area overlaps with each adjacent circular area such that said overall pattern is continuous across said array.

15. The apparatus of claim 1 including at least two said generators arranged in said chamber in an upstream and downstream relationship relative to the flow of said material.

* * * * *